United States Patent [19]

Petty

[11] Patent Number: 5,441,169

[45] Date of Patent: Aug. 15, 1995

[54] SAUCEPAN

[76] Inventor: Christopher K. Petty, 203 Wildemere Dr., South Bend, Ind. 46615

[21] Appl. No.: 179,152

[22] Filed: Jan. 10, 1994

[51] Int. Cl.⁶ .................................................. B65D 90/04
[52] U.S. Cl. ................................... 220/428; 220/912
[58] Field of Search ........................... 220/428, 912

[56] References Cited

U.S. PATENT DOCUMENTS

| 712,793 | 11/1902 | Henis et al. | 220/428 |
|---|---|---|---|
| 1,162,762 | 12/1915 | Flatau | 220/428 |
| 1,485,602 | 3/1924 | Fleischer | 220/428 |
| 2,255,134 | 9/1941 | Thomas | 220/428 |
| 2,357,421 | 9/1944 | Murray | 220/342 |
| 2,637,459 | 5/1953 | Jordan | 220/428 |
| 4,331,127 | 5/1982 | Grosso | 220/428 |
| 5,228,384 | 7/1993 | Kolosowski | 220/428 |

*Primary Examiner*—Joseph Man-Fu Moy
*Attorney, Agent, or Firm*—Baker & Daniels

[57] ABSTRACT

A saucepan of the double boiler type. The saucepan includes a lower water receptacle, an upper food receptacle and an attached handle. The handle defines an enclosed fill chamber which communicates with the lower water receptacle via a hole. A cap is connected to the handle by an over center hinge and covers a fill hole through which water may be introduced into the chamber and thence to the water receptacle. The cap may have a hole therein to provide an aural indicator of water boiling in the water receptacle.

2 Claims, 4 Drawing Sheets

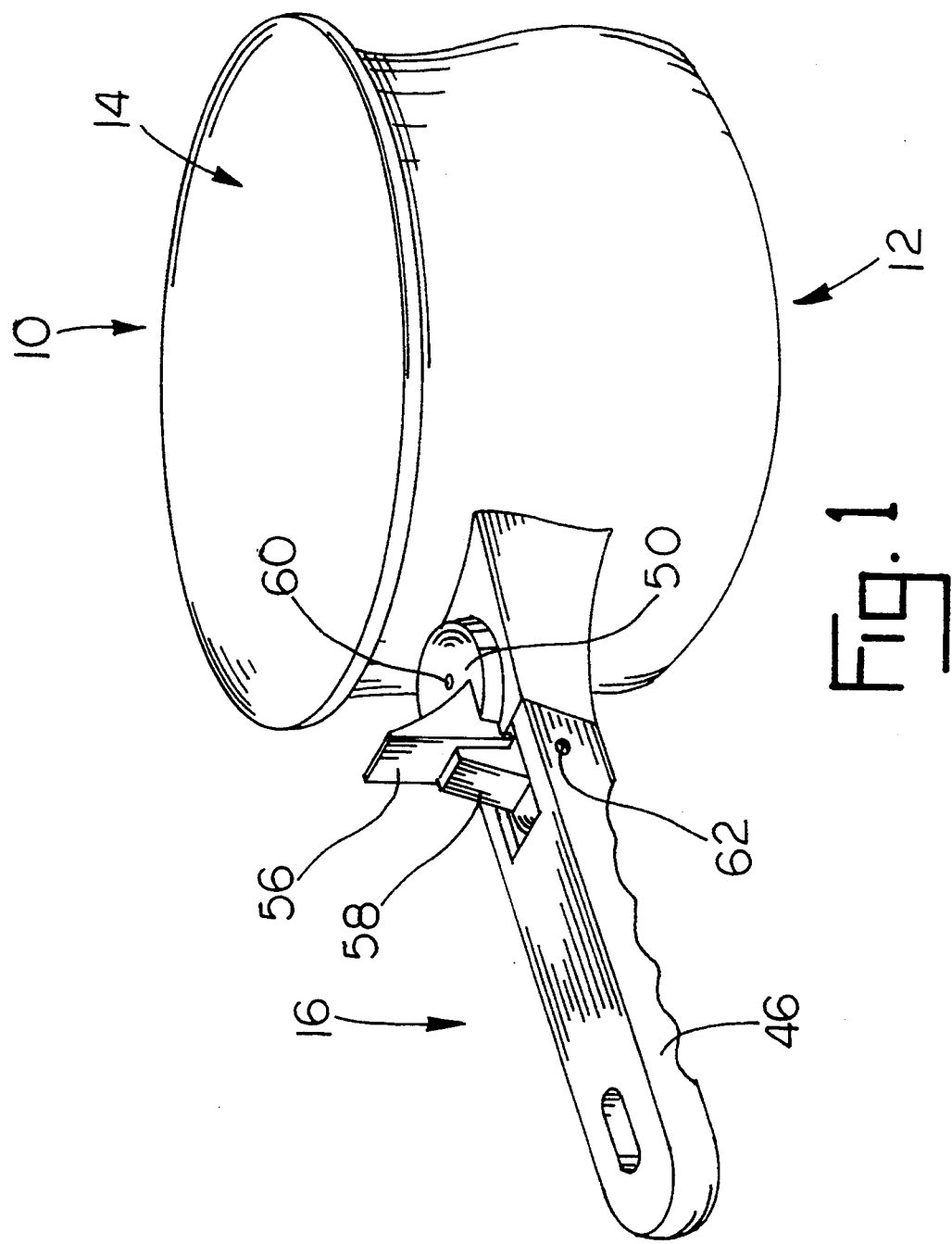

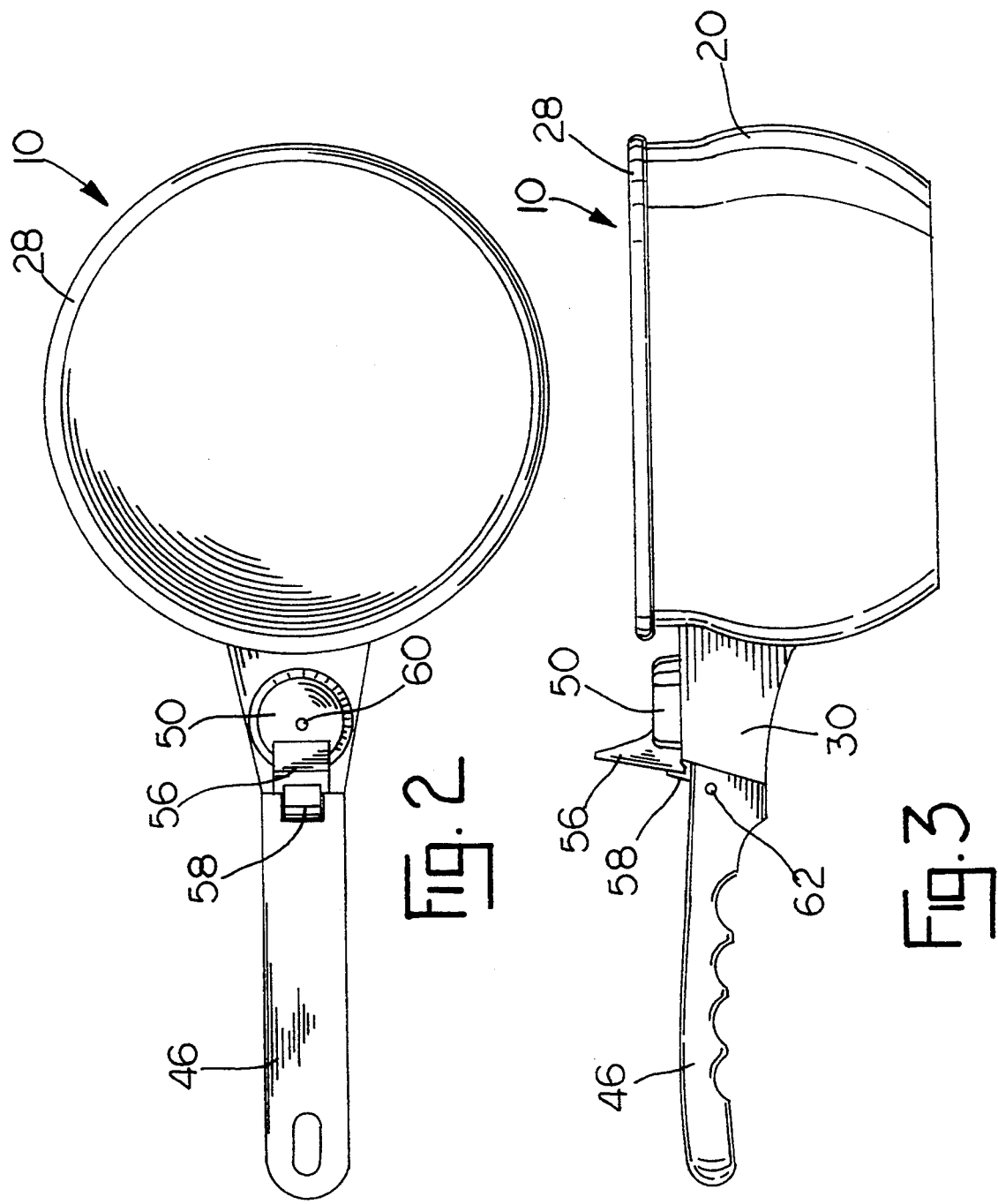

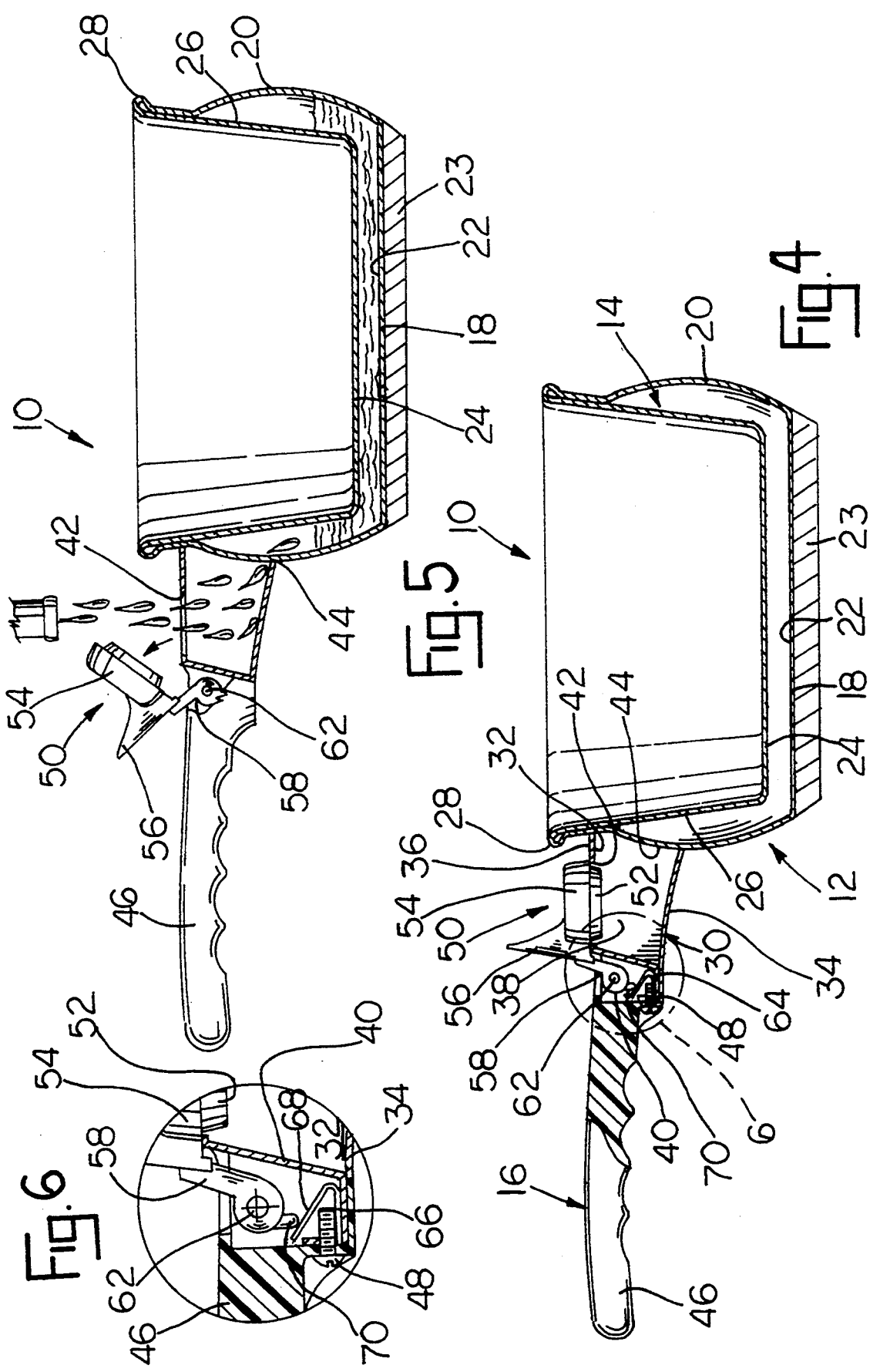

SAUCEPAN

SUMMARY OF THE INVENTION

This invention relates to cookware, and will have special application to saucepans, and particularly to double boilers.

Double boiler saucepans are typically used to cook food in a controlled low temperature manner. A common double boiler employs a lower pan which is filled with water and rests on the stove burner, and an upper pan which is carried inside the lower pan and holds the food to be cooked above the water. Since the water can only be raised to a temperature of 100° C. before it boils, the food is cooked at or below this temperature to prevent burning. Previous double boilers included separate upper and lower pans and provided no visual or aural indicator of the water temperature.

The double boiler saucepan of this invention includes an integral upper pan/lower pan construction. A housing is connected to the pan and defines a substantially enclosed chamber to which water may be added through a fill hole. The housing is in flow communication with the lower pan through a second hole.

The fill hole is covered by a normally closed cap which is connected to the housing by a pivot member which allows the cap to be pivotally shifted between its normally closed position and an open position to expose the fill hole. A biasing member serves to return the cap to its closed position when the cap is released. The cap may also have a tapered hole to allow escaping steam from the lower pan provide an aural indication of high temperatures in the lower pan.

The invention may be incorporated into any size of double boiler currently available and may be modified for use with saucepans having a single elongated handle or with opposite U-shaped handles.

Accordingly, it is an object of this invention to provide for a novel and improved saucepan for cooking foods.

Another object is to provide for a double boiler saucepan which is easier to use and store than conventional double boilers.

Another object is to provide an integral single-piece double boiler.

Another object is to provide a double boiler saucepan which provides an aural indication of high water temperature in the lower pan.

Other objects will become apparent upon a reading of the following description.

BRIEF DESCRIPTION OF THE DRAWINGS

FIG. 1 is a perspective view of a first embodiment of the saucepan.

FIG. 2 is a top plan view of the saucepan.

FIG. 3 is an elevation view of the saucepan.

FIG. 4 is a sectional view of the saucepan.

FIG. 5 is a sectional view similar to FIG. 4, showing the fill cap in an open position to illustrate addition of water to the lower pan.

FIG. 6 is a detail view of the biasing spring as seen in dotted circle 6 of FIG. 4.

DESCRIPTION OF THE PREFERRED EMBODIMENTS

Figure 7:
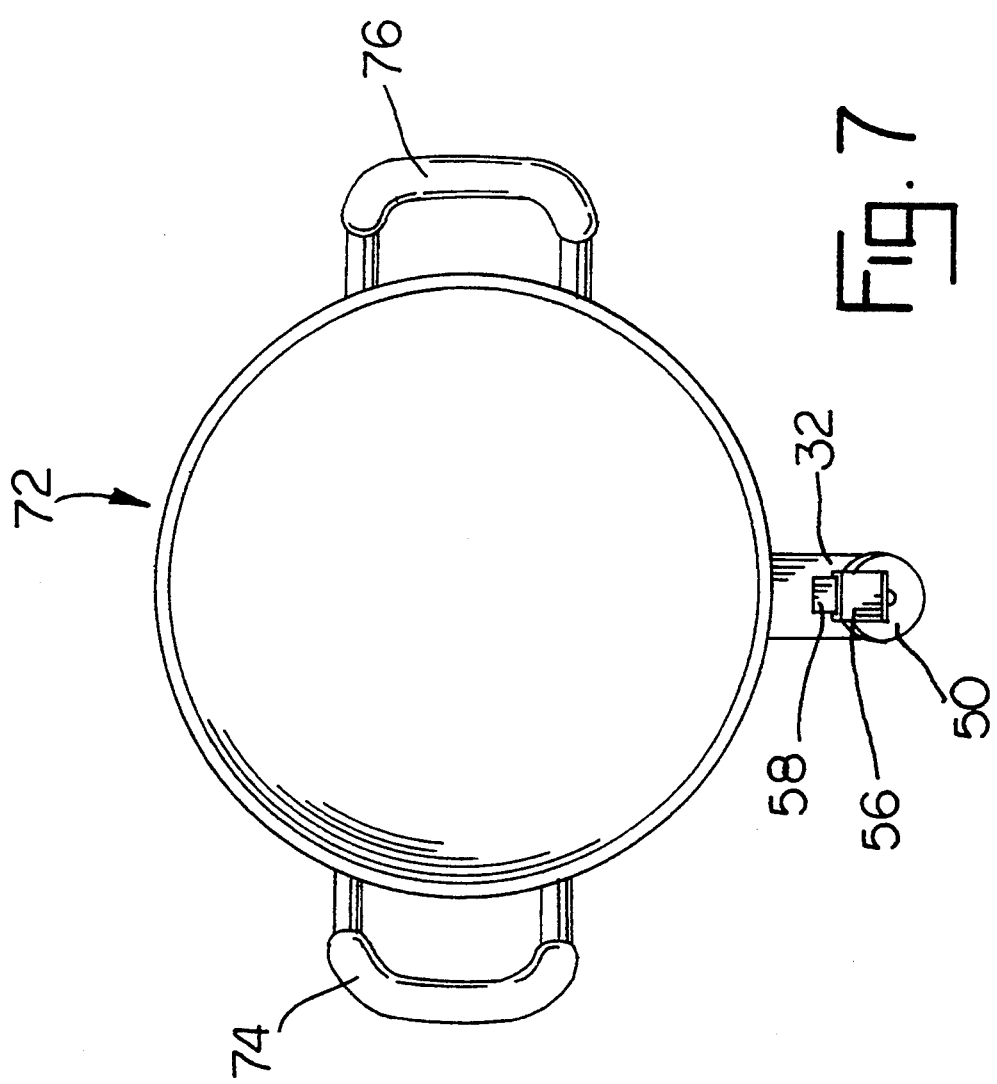
FIG. 7 is a top plan view of a second embodiment of the saucepan.

The preferred embodiments herein described are not intended to be exhaustive or to limit the invention to the precise forms disclosed. They are chosen and described to illustrate the principles of the invention, and its application and practical use to enable others skilled in the art to utilize its teachings.

FIGS. 1-6 illustrate a first embodiment of the double boiler 10 of this invention. Double boiler 10 includes generally a lower pan 12, upper pan 14 and elongated handle 16. Lower pan 12 is designed to accommodate water or other cooking fluid and is defined by bottom wall 18 and continuous outer side wall 20. Bottom wall 18 may include a lower coating or metal layer 23 of copper, while the bottom wall 18 and side wall 20 are preferably formed of stainless steel or the like. Side wall 20 is preferably rounded outwardly as shown so as to accommodate upper pan 14 and to define a chamber 22 to allow the water to contact the upper pan.

Upper pan 14 is defined by bottom wall 24 and continuous side wall 26, and is preferably formed of stainless steel or the like. As shown in FIG. 4, side walls 20 and 26 come together in overlap fashion and are rolled together to define continuous upper lip 28.

Handle 16 is an elongated member and includes a fill housing 30 which is attached to lower pan side wall 20 by conventional means. Fill housing defines chamber 32 and includes bottom wall 34, top wall 36, opposed side walls 38 and end block 40. Fill hole 42 is defined in top wall 36. A hole 44 is defined in lower pan side wall 20 and allows flow communication between chamber 32 and chamber 22. Handle 16 also includes terminal end part 46 preferably formed of a hardened phenolic plastic or the like. End part 46 is connected to fill housing end block 40 as by fastener 48.

Double boiler 10 also includes a fill cap 50 which normally covers fill hole 42. Cap 50 is preferably formed of a single piece hardened phenolic plastic and includes plug part 52, upper cap 54, actuator wedge 56 and hinge part 58. Plug part 52 closely approximates the dimensions of fill hole 42 to seal the fill hole when the cap 50 is in the normally closed position of FIG. 4. A tapered hole 60 is defined through plug 52 and upper cap 54 and communicates with chamber 32.

Hinge 58 is pivotally connected to end block 40 as by pivot fastener 62. Biasing spring 64 has a lower part 66 which rests on bottom wall 34 and angled upper part 68 as shown. Hinge 58 includes lower protrusion 70 which contacts spring upper part 68 in an over center relationship as shown in FIG. 6.

Double boiler 10 is used for temperature control cooking as follows. Cap 50 is raised to expose fill hole 42 (FIG. 5) by pushing actuator wedge 56 towards handle end part 46. Water is poured into chamber 32 and flows into chamber 22 through hole 44. When the desired amount of water has been added, wedge 56 is released. Spring upper part 68 acts on protrusion 70 to urge cap 50 back into the normally closed position shown in FIG. 4. Boiler 10 is placed on a hot stove burner (not shown) and food added to upper pan 14. Should the water in chamber 22 begin to boil (indicating a possible overheating situation) steam escaping through tapered hole 60 generates a whistling sound to provide an aural indication of the condition.

FIG. 7 shows a modified double boiler 72 which has opposite handles 74, 76. In this embodiment, fill housing

30 is connected directly to the lower pan side wall 26 as shown with all other reference characters designating like parts for purposes of convenience and clarity.

It is understood that the above description does not limit the invention to the above details, but may be modified within the scope of the following claims.

I claim:

1. A saucepan comprising a lower pan, an upper pan connected to said lower pan to define a closed chamber between said upper and lower pans, a fill housing connected to said lower pan and defining a fill hole and a fill chamber, said lower pan including a hole means for allowing flow communication between said fill chamber and said closed chamber, cap means for selectively covering said fill housing to prevent introduction and exiting of fluid therefrom, said cap means including a plug part and an opening means therethrough for creating an aural indication of rising temperatures within said closed chamber upon the escape of vapors from said fill chamber through said opening means, said cap means further including an integral hinge means for shifting said plug part between a normally closed position covering said fill hole and an open position exposing said fill chamber to allow water to be poured thereinto.

2. The saucepan of claim 1 and further including biasing means for urging said plug part towards its said normally closed position.

* * * * *